Nov. 14, 1961
I. H. SPRINGER ET AL
3,008,196
MULTIPLE GLASS STRUCTURAL UNIT AND
METHOD OF MAKING THE SAME
Filed Jan. 27, 1958
2 Sheets-Sheet 1
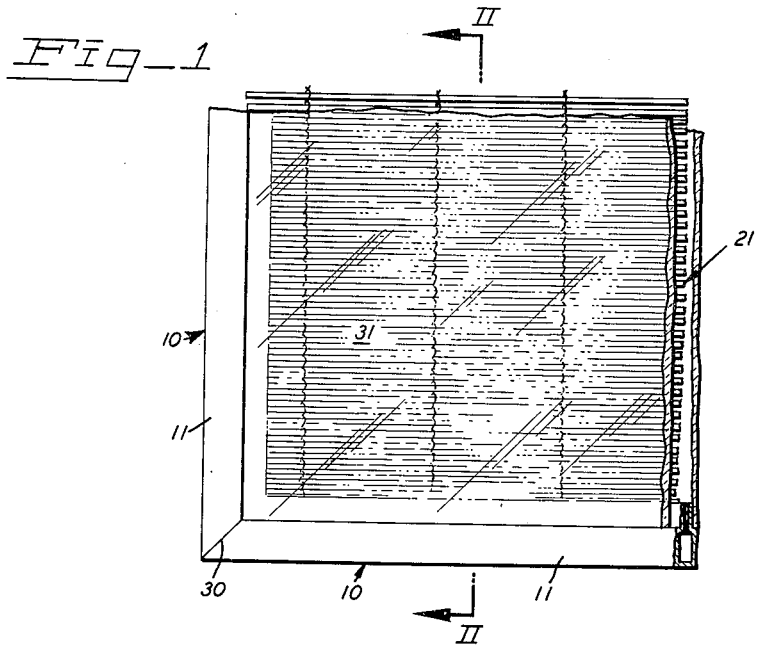
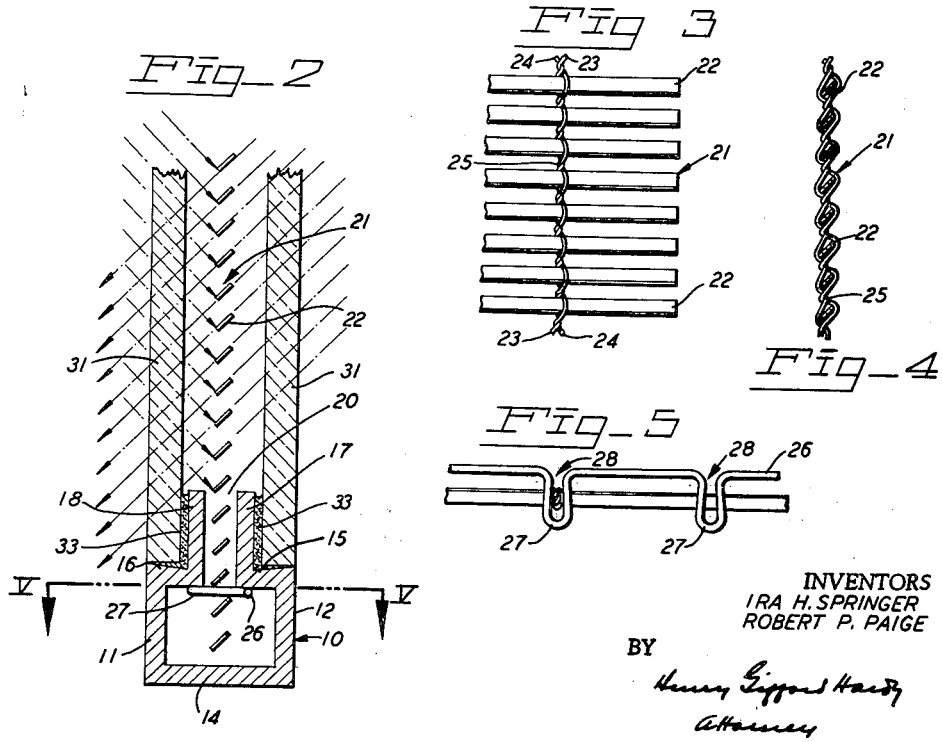
INVENTORS
IRA H. SPRINGER
ROBERT P. PAIGE
BY
Henry Gifford Hardy
Attorney Nov. 14, 1961    I. H. SPRINGER ET AL    3,008,196
MULTIPLE GLASS STRUCTURAL UNIT AND
METHOD OF MAKING THE SAME
Filed Jan. 27, 1958    2 Sheets-Sheet 2
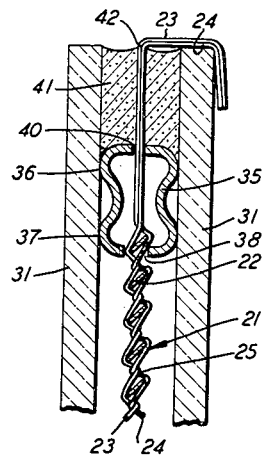
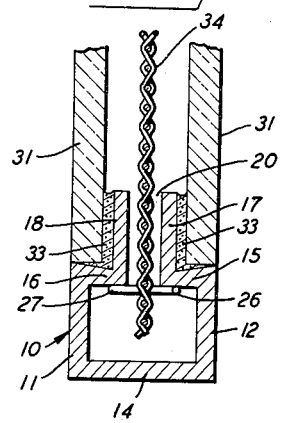
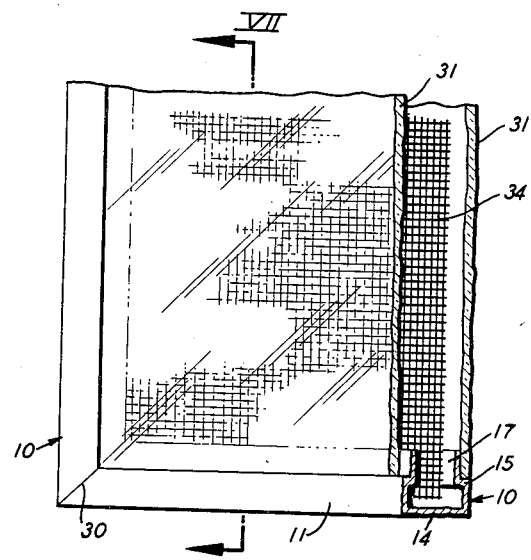
INVENTORS
IRA H. SPRINGER
ROBERT P. PAIGE
BY
Henry Gifford Hardy
Attorney.

United States Patent Office 3,008,196
Patented Nov. 14, 1961

3,008,196
MULTIPLE GLASS STRUCTURAL UNIT AND
METHOD OF MAKING THE SAME
Ira H. Springer, 69 Almaden Court, San Francisco, Calif., and Robert P. Paige, 130 Emalita Court, San Bruno, Calif.
Filed Jan. 27, 1958, Ser. No. 711,352
9 Claims. (Cl. 20—56.5)

This invention relates to a multiple glass sheet glazing unit for structural purposes such as windows and the like, having a sealed-in, light-intercepting screen, as well as to the method of economically producing the same.

Multiple pane window structures have been known for some time where the spaced panes provide a sealed internal chamber or dead air space, and such structures have been found to be particularly beneficial for insulating purposes.

It is also known in the art to place in the dead air space a light intercepting screen comprised of small horizontal louvers angled slightly from the horizontal and maintained in appropriate spaced relation by relatively wide, spaced, vertical twisted wire members. Screening of this type resembles a permanently angled Venetian blind on a minute scale, but it is well-understood that the width of the horizontal members and the angle of their inclination may be varied to suit or to respond to any requirements which may be involved, or to accomplish a particular desired result. Such screening is preferably made of metal and can either be surfaced to be heat reflecting or heat absorbing. The degree of tilt of the horizontal members and the vertical spacing, of course, will determine the degree and the nature of light interception.

It is among the objects of the present invention to provide such a structure where the screen member is evenly and uniformly stretched between its opposite margins without any contact with or reliance upon the glass portions for the suspension.

It is another object of the present invention to provide such a structure where the screen member is suspended in the dead air space so that it does not contact any of the glass surfaces.

It is a further object of the present invention to provide a structural glazing unit having a metallic or nonglass edging for stretching and supporting a light deflecting screen sealed between, but spaced from two panes of glass which abut the edging material.

It is likewise an object of this invention to provide a structure of the kind described wherein the edges of the two glass members are used to straighten the frame and accomplish the stretching of the screen.

It is a further object of the invention to provide a relatively thin glass structural unit comprising two parallel sheets of glass, a louvered screen member suspended therebetween, but without contact with either glass sheet, by a pair of oppositely disposed stretchers which also act as spacers for the glass members, and wherein the edges of the glass sheets are used to stretch the screen material prior to sealing.

It is another object to present new methods for the manufacture of multiple glass sheet glazing units, both with and without nonglass edging members.

Further objects are to provide a construction of maximum simplicity, economy and ease of manufacture, also such further objects, advantages and capabilities as will fully appear and as are inherently possessed by the invention described herein.

Invention further resides in the combination, construction and arrangement of parts illustrated in the accompanying drawings, and while there is shown therein a preferred embodiment thereof, and variations therefrom, it is to be understood that the same is merely illustrative of the invention and that the invention is capable of modification and change, and comprehends other details of construction without departing from the spirit thereof or the scope of the appended claims.

Referring to the drawings:

FIGURE 1 is an elevational view of a fragmentary corner portion of the multiple glass sheet glazing unit of the present invention in its preferred form;

FIGURE 2 is a vertical section on an enlarged scale taken along the line II—II of FIGURE 1;

FIGURE 3 is a fragmentary elevational view of a piece of the screen used in the preferred form;

FIGURE 4 is an end elevational view of the screen portion shown in FIGURE 3;

FIGURE 5 is a plan view taken on the line V—V of FIGURE 2;

FIGURE 6 is a view similar to that of FIGURE 1, only using an open-mesh screen instead of a louvered screen;

FIGURE 7 is a vertical section taken on the line VII—VII of FIGURE 6, and is similar to FIGURE 2;

FIGURE 8 is a vertical section showing a variant form without employing a nonglass edge; and FIGURE 9 is a vertical section similar to FIGURE 8, only showing a clamp-like clip for securing the pull on the spacer and the clamped screen.

Referring now more particularly to the drawings in which like reference numerals are used to designate substantially similar parts in the severals views, a portion of the completed structural member is shown in FIGURE 1 and broken away to expose the structural details thereof. For a clear delineation of the structure a vertical, transverse section on a larger scale is shown in FIGURE 2. A nonglass frame 10 is provided which conforms precisely with the size and shape desired for the finished structural member. Usually the shapes are rectangular. However, all that is necessary is that there shall be two oppositely disposed and parallel sides to accomplish the required stretching of the screening. It is not to be understood, however, that the two oppositely disposed parallel sides are required, but only that stretching is required. Further, it is to be understood that stretching can be accomplished with oppositely disposed curved channel members so that the preference for parallel straight sides is not a condition precedent. The channel or frame members 10 are preferably metallic and extruded in such form as to provide the shape shown in section in FIGURE 2 and repeated in FIGURE 7. Substantially the form in transverse section is a hollow rectangle, having oppositely disposed parallel sides 11 and 12, a bottom 14, inturned flanges 15 and 16, parallel to the bottom 14, which continue at right angles therefrom by means of lips 17 and 18 which are substantially parallel to each other but spaced apart leaving a space 20 therebetween. The width of the frame member 10, which is designated 14, represents the thickness of the structural unit in final form and in use. Accordingly, the frame members 10 are fine cut to lengths which represent the dimensions of the opening into which the structural unit is to be placed.

The light-intercepting member used in this structure is preferably a previously well-known screening member, the structure and nature of which, per se, forms no part of the present invention. The screening member 21 may be likened to a Venetian blind, except that its horizontal strips of louvers 22 are placed at a fixed angle to the vertical plane of the sheet glass whereas the transverse slats of the usual Venetian blind are adjustable as to the angle. The permanent cant or tilt, as well as the spacing of the slats or louvers 22, are maintained in locked position by a plurality of spaced wire pairs 23 and 24, which pass alternately over and under the successive louvers 22 and are twisted as at 25 between each successive louver.

Obviously, the screening 21 can, within the limits of space provided, be made of any size desired and any degree of tilt or cant. Also, the material used to make the screening member 21 is of no great concern except that it should be of permanent character and able to withstand decomposition and damage due to long exposure in sunlight. Likewise, it is apparent that the screening material may be coated in any suitable manner, either to be light-reflecting or light-absorbing.

To mount the screening in position during fabrication of the unit, and to maintain its stretched position, the screening member 21 is cut to the required shape, but with slightly shorter dimensions. Frame members are placed at the two opposite sides with the slats 22 running parallel therewith. It makes no difference whether the screening is placed with the louvers 22 vertical or horizontal with respect to the finished structural unit, as this is dependent upon the type of ultimate use intended for the structural unit. However, normally and by far the greater number of uses require the slats or louvers 22 to be horizontal in the finished unit. In such a case the top and bottom frame members 10 would be placed adjacent the screen section. A special resilient wire member 26 which has a substantially continuous linear form is provided which has regularly spaced loops 27, having open bottoms 28. As is shown in FIGURE 5, the loops 27 all lie in the same plane and are deep enough to more than bridge the gap 20 between the inturned frame portions 17 and 18 and so that the wire 26 and substantial portions of the loop ends 27 bear against the inner faces of the inturned flanges 15 and 16 of the frame member 10. The spacing between the loops 27 is short enough to secure practically continuous bearing along the length of the frame member. The wire 26 is pressed onto the screen 21 so that the openings 28 of the loops 27 pass over the pair of twisted wires 23 and 24, but so that the linear portion of the wire 26 passes between two adjacent louvers for the entire distance of the width of the screen member 21. The loops 27 are spaced closer together than the twisted wires 23 and 24 so that not every loop will engage the twisted wires, but the spacing should be such that each of the twisted wires 23 and 24 will be engaged by a loop 27. With the wire 26 in position on the edge of the screen member 21, as shown in FIGURE 5, one frame member 10, either the top or bottom, is fed endwise into the opening 20 between the inturned channel members 17 and 18, so that the holding wire 26, which is substantially transverse to the plane of the screen 21, bears against the inner faces of the inturned flanges 15 and 16 of the frame member. The same procedure is repeated with the frame member for the opposite side. It is apparent when this is completed that by pulling outwardly and oppositely on the top and bottom frame members, the screen member 21 will be stretched therebetween and securely and permanaently held therebetween.

On the opposite sides, at right angles to the top and bottom frame members, the appropriate side frame members 10 are added so that the exposed opposite marginal edges of the screen member 21 are loosely guided in and covered by the inner extensions 17 and 18 of the side frame members. When the corners 30 of the frame members 10 are joined together and permanently secured so that the final dimensions of the finished structure are established, there is a definite tendency for the top and bottom frame members to bow inwardly due to the pull of the screen member retained by the wire member 26. Two glass sheets 31 of the precise size and shape required for the final structural member and the frame members 10, are secured in position on the shoulder formed by the outer faces of the flange 15 and the inner extension 17 on one side and the flange 16 and inner extension 18 on the other side. The glass is held in position permanently by a suitable adhesive 33. It is apparent that when the glass sheets are placed in position and secured in position on the structural member, the edge of the glass at the top and the bottom of the frame members will remove the bow and return the frame to its proper parallel position, as well as causing the screen member 21 to be stretched between the opposite holding wires 26 and retained permanently in this stretched position. In this manner, the screen member 21 is permanently retained between the two glass sheets 31 in stretched condition and without any contact with the inner surface of the glass at either side. Improper stretching or relaxation of some of the metals may occasionally cause the light-intercepting screen 21 to touch at random along the inner face of one glass sheet or the other. However, this is not intended and is unsightly.

Stretching of the screen member 21 is necessary because nearly all screening is received with irregular waves in the surface due to all manner of things including delivery in rolls. Stretching is the only reliable means of eliminating the waves.

As the result of pursuing the steps mentioned and disclosed above, a new multipane structural form is produced, having directional light-intercepting member suspended therebetween but without contacting either of the glass sheets, nor is the light-intercepting screen in any way attached to or secured by either or both of the sheet glass members. All of this is accomplished without increasing the over-all thickness of the structural unit beyond the limit demands of the known prior art structures, so that the thickness of the structural unit is no way a deterrent to commercial use and acceptance. It is apparent that the glass sheets 31 are of suitable thickness so that this thickness, together with the required thickness of the adhesive layer 33 combine to equal the depth of the outer face of the inturned flanges 15 and 16. In this manner the outer face of each of the glass sheets is flush with the outer faces of the walls 11 and 12 of the frame members 10.

Referring to FIGURES 6 and 7, a variant form of screening 34 is shown. This is the ordinary woven screen similar to house screening and ordinary insect screening. It, of course, has light intercepting qualities, as does the screening 21, but no directional feature for the light interception is involved with the screening 34. The screening 34 is held within the frame member 10 and stretched by the wire member 26 in precisely the same manner as the screening 21, only in this instance the loops 27 are pushed through the openings between the warp and woof at the appropriate intervals. The resulting structural unit is precisely of the same structural characteristics as that shown in FIGURE 1 inasmuch as the screening is permanently stretched and held between the two panes of glass 31 without contact therewith.

Obviously, the use of the adhesive 33 in securing the glass sheets 31 in position on both faces of the structural unit effectively seals the air space between the two sheets of glass. In this kind of structure it is not necessary to use a vacuum to exhaust the air within this chamber, and, in fact, it is preferable not to do so. On the other hand, it has been found desirable to prevent the condensation or collection of moisture within this sealed chamber, so that it has been found useful in practicing this invention by purging this chamber before final sealing with a moisture free gas and placing a desiccant in the hollow chamber, preferably in the bottom frame member 10, which is thereupon permanently sealed therein.

With reference to FIGURE 8, a further variant form is shown in which the two glass sheets 31 are placed in parallel planes, spaced from each other, but where the outer edge of the glass itself accomplishes the stretching of the light-intercepting screen member 21 without using a separate frame. The separation between the glass sheets is determined by an extruded form 35 which preferably has two continuous points of contact 36 and 37 with the glass sheets at either side of its wider longitudinal length. On its inner, shorter dimension it is provided with a continuous longitudinal slot 38. Along the opposite narrower dimension and spaced lineally are a series of holes 40 which register with the vertical extensions of the pairs of twisted wires 23 and 24 of the screen member 21. The channel 38 or jaw is of sufficient width to permit the free passage of the screen member 21 therethrough.

The structural glass member shown in FIGURE 8 is formed in accordance with the following steps: The two glass members 31 are cut to the precise dimensions required for the opening which the unit is intended to close. The light-intercepting screen member 21 is cut longer at top and bottom in order to permit the removal of the louvers or slats 22 along said opposite marginal edges to leave a length of wires 23 and 24 for the required extensions (see FIGURE 8). These wires 23 and 24 are passed through the holes or longitudinal perforations 40 of the spacer member 35 and pulled outwardly so that there is a portion of the wires 23 and 24 extending beyond the edge of the unit. The jaw of the spreader or channel 38 is then squeezed together, preferably at a twist point 25, along its entire length to secure the screening therebetween. The spreader is then placed in the appropriate position along either the top or bottom marginal edge between the glass sheets 31 with the screening in position between the two panes of glass as indicated. An adhesive sealent 41 is then placed along the marginal edge of said glass panes so as to completely cover the outwardly exposed narrow face of the spreader 35 and fill the space between the two glass sheets and between the outer face of the spreader 35 and the marginal edge of the unit. As the adhesive dries and sets the wires 23 and 24 exposed therebeyond are pulled tightly and bent over the edge and outer face of each pane alternately. It is apparent that when this is done on the opposite side that the screen will be stretched between the two glass sheets 31 and out of contact with either one. At the sides the channel 22 of the spacer 35 merely loosely contains the side marginal edges of the screen 21 to cover the cut edge and to assist in maintaining the spacing. When the sealent 41 has completely hardened and dried, then the wires 23 and 24 are cut at 42 substantially flush with the exposed edge of the sealent. Thus, there is provided a multipane structural member having a light-intercepting member stretched therebetween, but without contact with any of the glass inner faces. It is apparent that hanger members may be used to accomplish the holding and stretching of the light intercepting screen member 34 in the structural form shown in FIGURE 8.

The spacer member 35, as shown in FIGURE 9, accomplishes the pull required for the stretching of the screen 21, rather than the extension wires 23 and 24. The spacer 35 is clamped to the screen 21 in the same manner as described above by closing the channel 38 thereover. The spacer is itself gripped at spaced intervals by the jaws 45a and 45b of the clip 44. The jaws of the clip 44 squeeze the spacer so that the outer face of the clip becomes a point of contact with the glass at substantially the proper altitude. The free ends 46 of the clips 44 are pulled to accomplish the stretching of the screen by exerting the pull along the length of the spacer 35, and the free ends 46 are then bent over the edges of the glass sheets 31 alternately as before described. Again, as soon as the sealent 40 has hardened, the free ends 46 of the clips 44 are cut off at 42 so as not to increase the set marginal dimensions of the finished structural unit. Side spacer members 35 may be used both in the structure of FIGURE 8 as well as the structure of FIGURE 9, only the channel opening 38 must be enlarged to accommodate the free passage of the over-all thickness of the screen member used. It is apparent that any type of screen member may be used in these modifications as well as in the preferred form.

We claim:

1. A multipane window structural member comprising in combination two substantially parallel glass sheet members spaced from each other, a stretched screen member between said glass sheet members but spaced from each, spacer means gripping two opposite marginal edges of said screen for spacing said glass sheets and gripping said screen each from the other, clip means for gripping said spacer means and pulling it into operative position evenly stretching said screen member so that it is free of contact with said glass sheets, and sealent means for permanently holding the said spacer and clip means in operative position, as well as sealing the remaining marginal edges between said glass sheets.

2. A multipane window structural member comprising in combination two substantially parallel glass sheet members spaced from each other, a stretched light modifying screen member between said glass sheet members but spaced from each, spacer means gripping two opposite marginal edges of said screen for spacing said glass sheets and gripping said screen, clip means for gripping said spacer means and pulling it into operative position evenly stretching said screen member so that it is free of contact with said glass sheets, and sealent means for permanently holding the said spacer and clip means in operative position, as well as sealing the remaining marginal edges between said glass sheets.

3. A multiple sheet glazing unit comprising in combination a pair of spaced parallel sheets of glass, spacer members therebetween and adjacent two opposite marginal edges of said glass sheets, said spacer members having a longitudinal opening forming jaws for clamping two opposite marginal edges of a screen member, a screen member between said glass sheets evenly stretched and maintained spaced from said glass sheets by said spacer members, and means for retaining said clamped spacer members in operative position adjacent the opposite edges of said glass sheets, said means also closing the space between the other two marginal edges of said glass sheets.

4. A multiple sheet glazing unit comprising in combination a pair of spaced parallel sheets of glass, spacer members therebetween and adjacent two opposite marginal edges of said glass sheets, said spacer members having a longitudinal opening forming jaws for clamping two opposite marginal edges of a light deflecting screen member, a light deflecting screen member between said glass sheets evenly stretched and maintained spaced from said glass sheets by said spacer members, and means for retaining said clamped spacer members in operative position adjacent the opposite position adjacent the opposite edges of said glass sheets, as well as closing the space between the other marginal edges of said glass sheets.

5. A multiple sheet glazing unit comprising in combination a pair of spaced parallel sheets of glass, spacer members therebetween and adjacent two opposite marginal edges of said glass sheets, said spacer members having a longitudinal opening forming jaws for clamping two opposite marginal edges of a light deflecting screen member, a light deflecting screen member between said glass sheets evenly stretched and maintained spaced from said glass sheets by said spacer members, means for stretching said screen member by opposite tension on said clamped spacer members, and sealant means for retaining said clamped spacer members in operative position adjacent said opposite edges of said glass sheets, and sealing the space between the other two marginal edges of said glass sheets.

6. A multiple sheet glazing unit comprising in combination a pair of spaced parallel sheets of glass, spacer members therebetween and adjacent two opposite marginal edges of said glass sheets, said spacer members having a longitudinal opening forming jaws for clamping two opposite marginal edges of a light reflecting screen member, a light deflecting screen member between said glass sheets evenly stretched and maintained spaced from said glass sheets by said spacer members, clip means associated with said spacer members for stretching said screen member by opposite tension on said clamped spacer members, and sealent means for retaining said clamped spacer members in operative position adjacent the opposite edges of said glass sheets, as well as sealing the space between the other marginal edges of said glass sheets.

7. The method of making a multiple glass structural unit including the steps of cutting uniform single frame members to fit the size of the desired finished unit, said frame members being hollow and having a pair of inwardly directed flanges terminating in parallel, spaced lips defining an inwardly stepped recess slightly more in depth than the thickness of the glass panes on opposite faces providing an inner peripheral channel to the interior of the frame, cutting a screen member proportionally smaller than the size of the finished unit, securing said screen member in said channel between the flanges of two opposite frame members, completing the frame by securing the other frame members together with the other marginal edges of the screen passing freely in the channel between the spaced flanges, and sealing the glass sheets to the flanges in the recessed portion of the frame on each face of said frame, to stretch the screen member and maintain the same in stretched condition between said glass sheets without contact with said glass sheets.

8. The method of making a multiple glass structural unit including the steps of cutting uniform single frame members to fit the size of the desired finished unit, said frame members being hollow and having a pair of inwardly directed flanges terminating in parallel, spaced lips defining an inwardly stepped recess slightly more in depth than the thickness of the glass panes on opposite faces providing an inner peripheral channel to the interior of the frame, cutting a light deflecting screen member proportionally smaller than the size of the finished unit, securing said light deflecting screen member by means within said hollow frame within the channel between the flanges of two opposite frame members, completing the frame by securing the other frame members together with the other marginal edges of the screen passing freely between the channel between the spaced flanges and lips, and sealing glass sheets to the flanges in the recessed portion of the frame on each face of said frame, to stretch the screen member and maintain the same in evenly stretched condition between said glass sheets without contact with said glass sheets.

9. The method of making a multiple glass structural unit including the steps of cutting single form frame members to fit the size of the desired finished unit, said frame members being hollow and having a pair of inwardly directed flanges terminating in parallel, spaced lips defining an inwardly stepped recess slightly more in depth than the thickness of the glass panes on opposite faces providing an inner peripheral channel leading to the interior thereof, cutting a light deflecting screen member proportionally smaller than the size of the finished unit, securing said light deflecting screen member by means retained within said hollow frame while permitting said screen to pass through the channel between the flanges of two opposite frame members, completing the frame by securing the other frame members together with the other marginal edges of the screen passing freely between the spaced flanges and lips, placing a desiccant within the hollow frame, and sealing glass sheets to the flanges in the recessed portion of the frame on each face of said frame, to evenly stretch the screen member and maintain the same in stretched condition between said glass sheets without contact with said glass sheets and to seal the interior chamber therebetween.

References Cited in the file of this patent

UNITED STATES PATENTS

| | | |
|---|---|---|
| 2,630,170 | Ewing | Mar. 3, 1953 |
| 2,787,031 | Ansil | Apr. 2, 1957 |
| 2,874,423 | Berg | Feb. 24, 1959 |
| 2,877,516 | Bobel | Mar. 17, 1959 |